United States Patent
Takahata

(10) Patent No.: US 9,281,513 B2
(45) Date of Patent: Mar. 8, 2016

(54) LITHIUM-ION SECONDARY BATTERY

(75) Inventor: Koji Takahata, Toyota (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 106 days.

(21) Appl. No.: 14/235,463

(22) PCT Filed: Jul. 29, 2011

(86) PCT No.: PCT/JP2011/067537
§ 371 (c)(1),
(2), (4) Date: Jan. 28, 2014

(87) PCT Pub. No.: WO2013/018182
PCT Pub. Date: Feb. 7, 2013

(65) Prior Publication Data
US 2014/0186702 A1    Jul. 3, 2014

(51) Int. Cl.
*H01M 4/587* (2010.01)
*H01M 4/1393* (2010.01)
*H01M 4/04* (2006.01)
*H01M 4/133* (2010.01)
*H01M 4/36* (2006.01)
*H01M 10/0525* (2010.01)

(52) U.S. Cl.
CPC ............ *H01M 4/0404* (2013.01); *H01M 4/133* (2013.01); *H01M 4/1393* (2013.01); *H01M 4/364* (2013.01); *H01M 4/587* (2013.01); *H01M 10/0525* (2013.01); *Y02E 60/122* (2013.01); *Y02T 10/7011* (2013.01)

(58) Field of Classification Search
CPC . H01M 4/133; H01M 4/0404; H01M 4/1393; H01M 4/587; H01M 4/364; H01M 10/0525; Y02E 60/122; Y02T 10/7011
See application file for complete search history.

(56) References Cited

U.S. PATENT DOCUMENTS

2002/0182492 A1   12/2002   Kimura et al.
2010/0092869 A1    4/2010   Kaneko et al.

FOREIGN PATENT DOCUMENTS

| CN | 2574229 | 9/2003 |
|---|---|---|
| CN | 101127394 | 2/2008 |
| JP | 5-290844 | 11/1993 |
| JP | 2007-242630 | 9/2007 |
| JP | 2009-64574 | 3/2009 |
| JP | 2010-97696 | 4/2010 |

*Primary Examiner* — Brittany Raymond
(74) *Attorney, Agent, or Firm* — Finnegan, Henderson, Farabow, Garrett & Dunner, LLP

(57) ABSTRACT

A lithium-ion secondary battery (100A) has a negative electrode current collector (241A) and a negative electrode active material layer (243A) formed on the negative electrode current collector (241A). The negative electrode active material layer (243A) contains a graphite material and a binder. The negative electrode active material layer (243A) has a first region (A1) neighboring the negative electrode current collector (241A), and the first region (A1) contains natural graphite in a weight ratio of equal to or greater than 80% of the graphite material. The negative electrode active material layer (243A) has a second region (A2) neighboring a surface thereof, and the second region (A2) contains artificial graphite in a weight ratio of equal to or greater than 80% of the graphite material.

8 Claims, 14 Drawing Sheets

LITHIUM-ION SECONDARY BATTERY

CROSS-REFERENCE TO RELATED APPLICATIONS

This application is a national phase application of International Application No. PCT/JP2011/067537, filed Jul. 29, 2011, the content of which is incorporated herein by reference.

TECHNICAL FIELD

The present invention relates to lithium-ion secondary batteries. In the present description, the term "secondary battery" refers to a repeatedly chargeable storage device in general. Further, in the present description, the term "lithium ion secondary battery" refers to a secondary battery in which lithium ions are used as electrolyte ions and charging and discharging are implemented by the transfer of electrons accompanying lithium ions between positive and negative electrodes.

BACKGROUND ART

Regarding such a lithium-ion secondary battery, JP H05 (1993)-290844 A, for example, discloses the use of a mixture of natural graphite and artificial graphite as a negative electrode material capable of storing and releasing lithium, for a lithium secondary battery using a $LiPF_6$-containing electrolyte solution.

This publication describes that natural graphite (rhombic structure), which tends to overreact with $LiPF_6$ at high temperature, is mixed with artificial graphite (hexagonal structure), which has low reactivity with $LiPF_6$, so that natural graphite and $LiPF_6$ can be inhibited from excessively reacting with each other.

JP 2010-97696 A discloses the use of a negative electrode active material in which amorphous carbon is coated or adhered to the surfaces of graphite particles.

In addition, JP 2009-64574 A discloses that a plurality of negative electrode active material layers are formed on a negative electrode current collector so that a far side thereof from the negative electrode current collector shows higher charge rate performance than a near side thereof to the negative electrode current collector. This publication also discloses that artificial graphite is used as the negative electrode active material in the near side to the negative electrode current collector and natural graphite is used as the negative electrode active material in the far side from negative electrode current collector.

CITATION LIST

Patent Literature

[Patent Literature 1] JP H05(1993)-290844 A
[Patent Literature 2] JP 2010-97696 A
[Patent Literature 3] JP 2009-64574 A

SUMMARY OF INVENTION

Technical Problem

Lithium-ion secondary batteries have been incorporated in automobiles such as hybrid electric vehicles, plug-in hybrid vehicles, and what is called electric vehicles, as the power source for the mechanism for driving the automobiles. In such an application as the vehicle drive batteries, the amount of discharge increases, for example, when accelerating the automobile. When running an automobile, it is usual to repeat acceleration and deceleration, which results in the repetition of discharge and charge at high rate.

The present inventor intends to use natural graphite as a negative electrode active material for the lithium-ion secondary battery used as the vehicle-driving battery as described above. However, when using natural graphite as a negative electrode active material, the capacity retention ratio considerably deteriorates when the battery is stored for a long period of time. In view of the problem, it appears possible to use a mixture of natural graphite and artificial graphite. However, merely mixing natural graphite and artificial graphite together may result in an increase in the resistance during continuous discharging. Thus, when using natural graphite and artificial graphite for the negative electrode active material, it is desirable to maintain the capacity retention ratio in long-term storage at a high level and also to keep the resistance increase during continuous discharging to be small.

Solution to Problem

A lithium-ion secondary battery according to the present invention has a negative electrode current collector and a negative electrode active material layer formed on the negative electrode current collector. The negative electrode active material layer contains a graphite material and a binder. The negative electrode active material layer has a first region neighboring the negative electrode current collector. The first region contains natural graphite in a weight ratio of equal to or greater than 80% of the graphite material. The negative electrode active material layer has a second region neighboring a surface thereof. The second region contains artificial graphite in a weight ratio of equal to or greater than 80% of the graphite material. With such a configuration, the lithium-ion secondary battery can improve the capacity retention ratio after long-term storage and also keep the resistance increase during continuous discharging small. In particular, the charge-discharge cycle performance under a low-temperature environment is improved.

In this case, the second region A2 may be a 10%-30% region of the negative electrode active material layer from a surface of the negative electrode active material layer. The first region may be a region of the negative electrode active material layer excluding the second region.

It is possible that the artificial graphite have a BET specific surface area of from 1.8 $m^2$/g to 4.0 $m^2$/g. It is also possible that the natural graphite have a BET specific surface area of from 2.0 $m^2$/g to 4.5 $m^2$/g. In addition, it is desirable that the natural graphite be at least partially covered with an amorphous carbon film. In this case, it is desirable that the weight ratio of the amorphous carbon film in the natural graphite be $0.01 \leq X \leq 0.10$.

It is desirable that a method of manufacturing a lithium-ion secondary battery may include: a step A of preparing a first paste comprising a mixture of natural graphite, a binder, and a solvent; a step B of preparing a second paste comprising a mixture of artificial graphite, a binder, and a solvent; a step C of coating the first paste prepared in the step A onto a negative electrode current collector; and a step D of coating the second paste prepared in the step B over the first paste coated on the negative electrode current collector in the step C.

DESCRIPTION OF EMBODIMENTS

Here, an example of the structure of a lithium-ion secondary battery will be described first. Then, referring to the example of the structure as appropriate, a lithium-ion secondary battery according to one embodiment of the present invention will be described. The parts and components that exhibit the same workings are denoted by the same reference symbols as appropriate. The drawings are depicted schematically and do not necessarily reflect actual objects. The drawings merely show examples, and they do not limit the invention unless otherwise stated.

Figure 1:
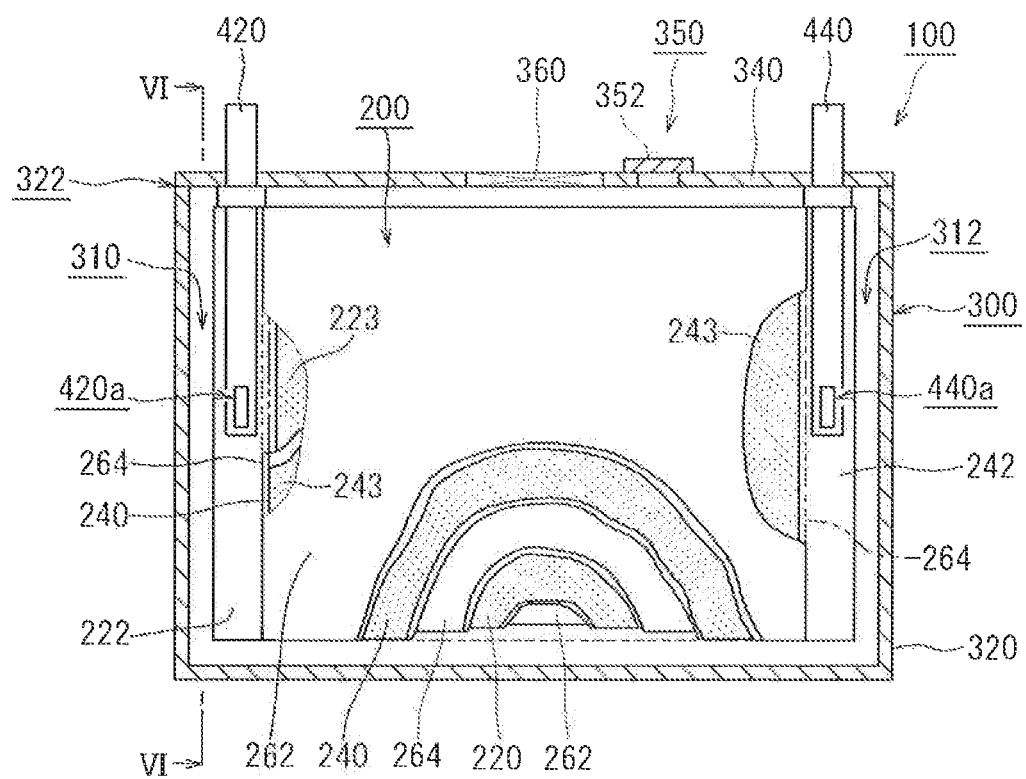
FIG. 1 is a view illustrating one example of the structure of a lithium-ion secondary battery.
Figure 2:
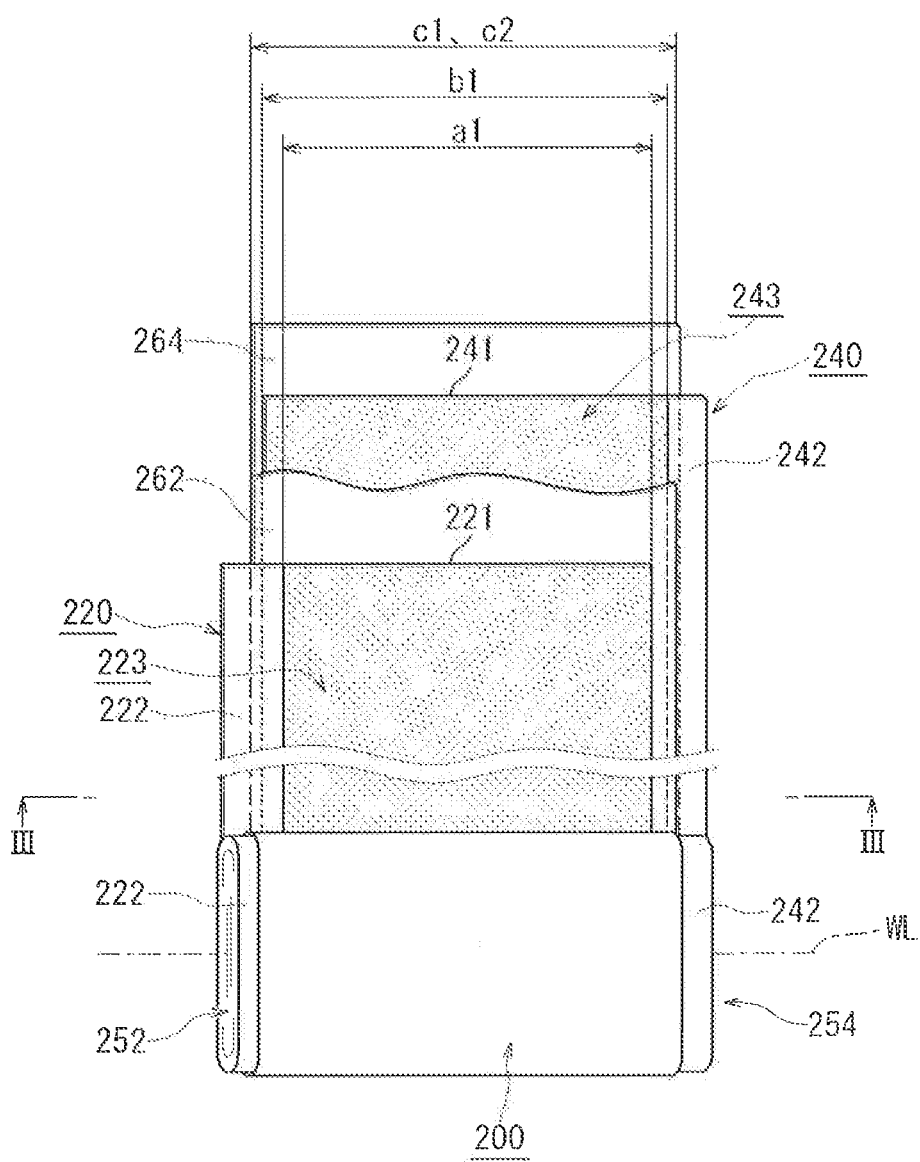
FIG. 2 is a view illustrating a wound electrode assembly of the lithium-ion secondary battery.
Figure 3:
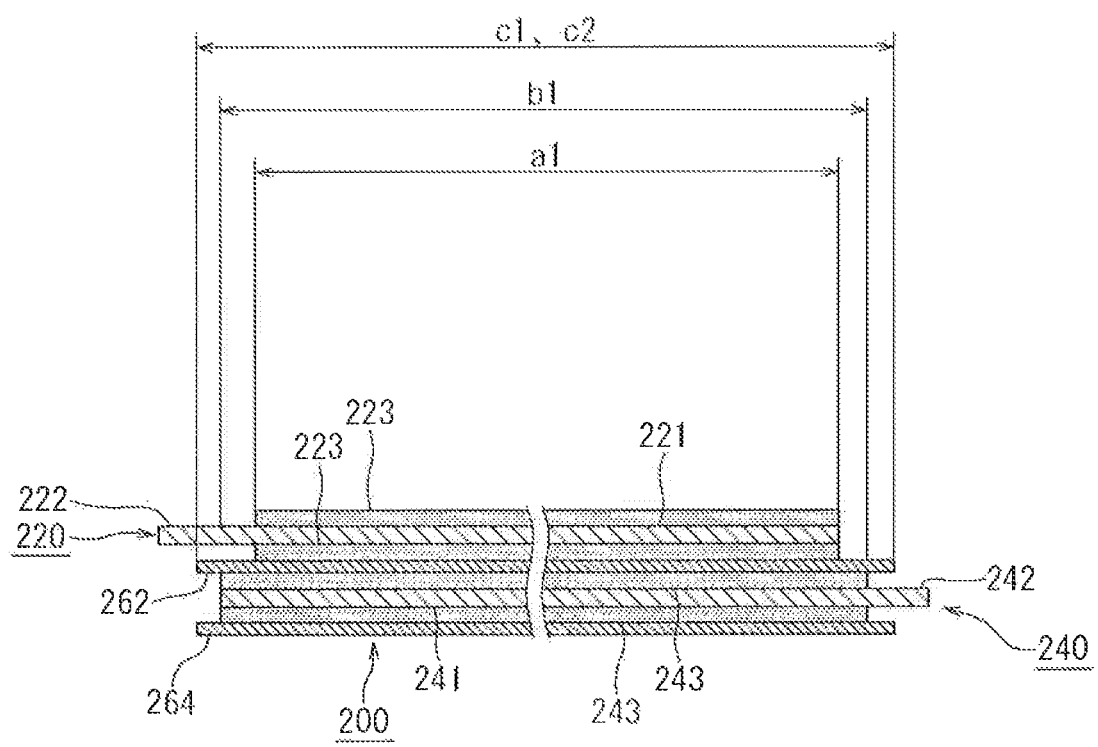
FIG. 3 is a cross-sectional view taken along line III-III in FIG. 2.

FIG. 1 illustrates a lithium-ion secondary battery 100. As illustrated in FIG. 1, the lithium-ion secondary battery 100 has a wound electrode assembly 200 and a battery case 300. FIG. 2 is a view illustrating the wound electrode assembly 200. FIG. 3 shows a cross section taken along line III-III in FIG. 2.

As illustrated in FIG. 2, the wound electrode assembly 200 has a positive electrode sheet 220, a negative electrode sheet 240, and separators 262 and 264. The positive electrode sheet 220, the negative electrode sheet 240, and the separators 262 and 264 are strip-shaped sheets.

<<Positive Electrode Sheet 220>>

The positive electrode sheet 220 has a strip-shaped positive electrode current collector 221 and a positive electrode active material layer 223. A metal foil suitable for the positive electrode may be used preferably for the positive electrode current collector 221. For the positive electrode current collector 221, it is possible to use, for example, a strip-shaped aluminum foil having a predetermined width and a thickness of about 15 μm. An uncoated portion 222 is provided along one lateral-side edge of the positive electrode current collector 221. As illustrated in FIG. 3, the positive electrode active material layer 223 is retained on both faces of the positive electrode current collector 221 except for the uncoated portion 222, which is provided in the positive electrode current collector 221, in the example shown in the figure. The positive electrode active material layer 223 contains a positive electrode active material. The positive electrode mixture layer 223 is formed by coating a positive electrode mixture containing the positive electrode active material onto the positive electrode current collector 221.

<<Positive Electrode Active Material Layer 223 and Positive Electrode Active Material Particles 610>>

Figure 4:
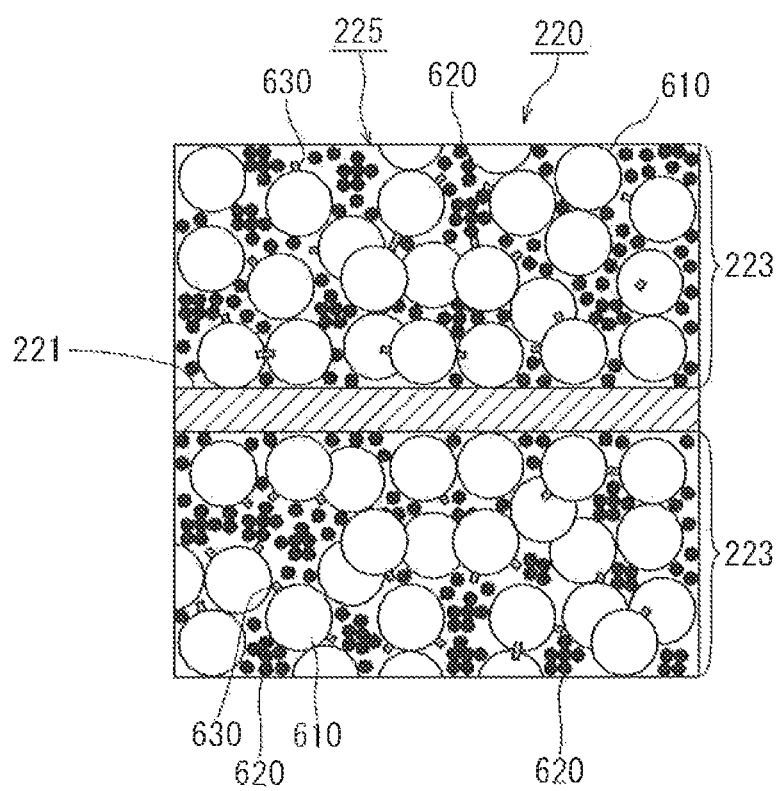
FIG. 4 is a cross-sectional view illustrating the structure of a positive electrode active material layer.

Here, FIG. 4 is a cross-sectional view of the positive electrode sheet 220. In FIG. 4, positive electrode active material particles 610, conductive agent 620, and binder 630 in the positive electrode active material layer 223 are enlarged schematically so that the structure of the positive electrode active material layer 223 can be shown clearly. As illustrated in FIG. 4, the positive electrode active material layer 223 contains the positive electrode active material particles 610, the conductive agent 620, and the binder 630.

Various types of substances that can be used as the positive electrode active material of lithium-ion secondary batteries may be used for the positive electrode active material particles 610. Examples of the positive electrode active material particles 610 include lithium transition metal oxides, such as $LiNiCoMnO_2$(lithium-nickel-cobalt-manganese composite oxide), $LiNiO_2$ (lithium nickel oxide), $LiCoO_2$ (lithium cobalt oxide), $LiMn_2O_4$ (lithium manganese oxide), and $LiFePO_4$ (lithium iron phosphate). Here, $LiMn_2O_4$ may have, for example, a spinel structure. $LiNiO_2$ and $LiCoO_2$ may have a layered rock-salt structure. $LiFePO_4$ may have, for example, an olivine structure. The $LiFePO_4$ with an olivine structure may have, for example, particles in the range of nanometers. The $LiFePO_4$ with an olivine structure may further be coated with a carbon film.

<<Conductive Agent 620>>

Examples of the conductive agent 620 include carbon materials, such as carbon powder and carbon fiber. As the conductive agent 620, it is possible to use one of the just-mentioned examples of the conductive agents either alone or in combination with another one or more of the examples. Examples of the carbon powder include various types of carbon blacks (such as acetylene black, oil-furnace black, graphitized carbon black, carbon black, graphite, and Ketjen Black) and graphite powder.

<<Binder 630>>

The binder 630 serves to bond the particles of the positive electrode active material particles 610 and the conductive agent 620 contained in the positive electrode active material layer 223 with each other, and to bond these particles with the positive electrode current collector 221. As the binder 630, it is possible to use polymers that can be dissolved or dispersed in the solvent used. For example, for the positive electrode mixture composition using an aqueous solvent, it is preferable to use water-soluble or water-dispersible polymers, including: cellulose-based polymers (such as carboxymethylcellulose (CMC) and hydroxypropyl methyl cellulose (HPMC)); fluoropolymers (such as polyvinyl alcohol (PVA), polytetrafluoroethylene (PTFE), and tetrafluoroethylene-hexafluoropropylene copolymer (FEP)); and rubber materials (such as vinyl acetate copolymer, styrene-butadiene copolymer (SBR), acrylic acid-modified SBR resin (SBR latex)). For the positive electrode mixture composition using a non-aqueous solvent, it is preferable to use polymers (such as polyvinylidene fluoride (PVDF), polyvinylidene chloride (PVDC), and polyacrylonitrile (PAN)).

<<Thickening Agent and Solvent>>

The positive electrode active material layer 223 is formed, for example, in the following manner: the positive electrode active material particles 610 and the conductive agent 620 mentioned above are mixed into a paste form (slurry form) in a solvent to prepare a positive electrode mixture, which is then coated onto the positive electrode current collector 221, dried, and pressure-rolled. In this case, either an aqueous solvent or a non-aqueous solvent can be used as the solvent for the positive electrode mixture. A preferable example of the non-aqueous solvent is N-methyl-2-pyrrolidone (NMP). The above-mentioned examples of the polymer materials used as the binder 630 can also be used for the purpose of obtaining the function as an addition agent, such as a thickening agent for the positive electrode mixture, in addition to the function as the binder.

It is preferable that the mass ratio of the positive electrode active material in the entire positive electrode mixture be about 50 wt. % or more (typically from 50 wt. % to 95 wt. %), and generally more preferably from about 70 wt. % to about 95 wt. % (e.g., from 75 wt. % to 90 wt. %). The proportion of the conductive agent in the entire positive electrode mixture may be from about 2 wt. % to about 20 wt. %, and generally preferably from about 2 wt. % to about 15 wt. %. In a composition that uses a binder, the proportion of the binder in the entire positive electrode mixture may be from about 1 wt. % to about 10 wt. %, and generally preferably from about 2 wt. % to about 5 wt. %.

<<Negative Electrode Sheet 240>>

As illustrated in FIG. 2, the negative electrode sheet 240 has a strip-shaped negative electrode current collector 241 and a negative electrode active material layer 243. A metal foil suitable for the negative electrode may be used preferably for the negative electrode current collector 241. A strip-shaped copper foil having a predetermined width and a thickness of about 10 μm is used for this negative electrode current collector 241. An uncoated portion 242 is provided along one lateral-side edge of the negative electrode current collector 241. The negative electrode active material layer 243 is formed on both faces of the negative electrode current collector 241 except for the uncoated portion 242, which is provided in the negative electrode current collector 241. The negative electrode mixture layer is retained by the negative electrode current collector 241, and contains at least a negative electrode active material. In the negative electrode active material layer 243, a negative electrode mixture containing a negative electrode active material is coated on the negative electrode current collector 241.

<<Negative Electrode Active Material Layer 243>>

Figure 5:
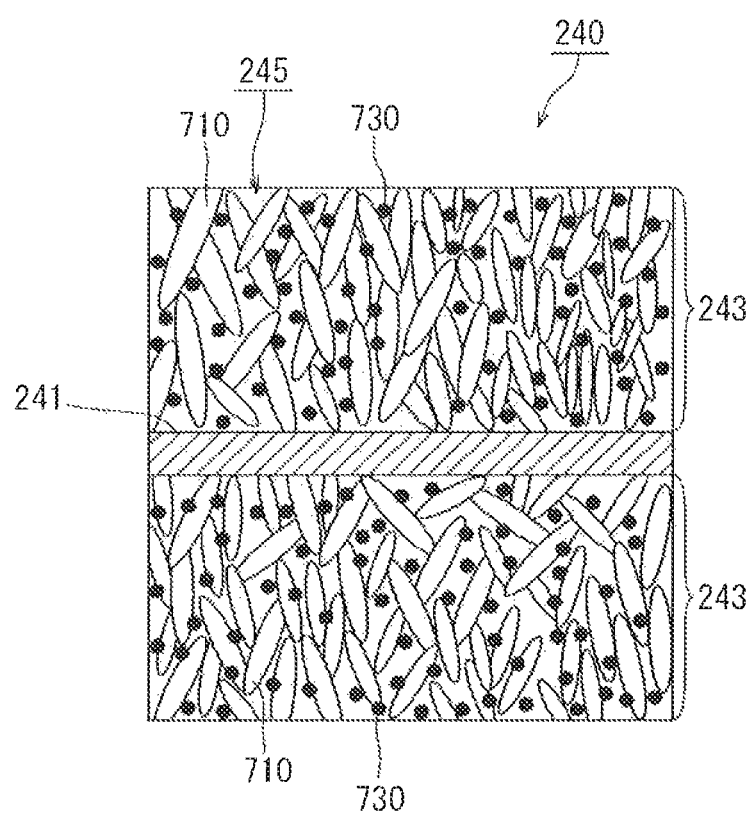
FIG. 5 is a cross-sectional view illustrating the structure of a negative electrode active material layer.

FIG. 5 is a cross-sectional view of the negative electrode sheet 240 of the lithium-ion secondary battery 100. As illustrated in FIG. 5, the negative electrode active material layer 243 contains negative electrode active material particles 710, a thickening agent (not shown), a binder 730, and the like. In FIG. 5, the negative electrode active material particles 710 and the binder 730 in the negative electrode active material layer 243 are enlarged schematically so that the structure of the negative electrode active material layer 243 can be shown clearly.

<<Negative Electrode Active Material Particles 710>>

As the negative electrode active material particles 710, it is possible to use any conventional material used for lithium-ion secondary batteries, either alone or in combination, without any particular limitation. Examples include particulate carbon materials (carbon particles) at least partially containing a graphite structure (a layered structure). More specifically, the negative electrode active material may be natural graphite, natural graphite coated with amorphous carbon material, graphitic materials (graphites), non-graphitizable carbons (hard carbons), graphitizable carbons (soft carbons), and combinations thereof. Here, the figure depicts a case in which what is called flake graphite is used as the negative electrode active material particle 710, but the negative electrode active material particle 710 is not limited to the example shown in the figure.

<<Thickening Agent and Solvent>>

The negative electrode active material layer 243 is formed, for example, in the following manner: the negative electrode active material particles 710 and the binder 730 mentioned above are mixed into a paste form (slurry form) in a solvent to prepare a negative electrode mixture, which is then coated onto the negative electrode current collector 241, dried, and pressure-rolled. In this case, either an aqueous solvent or a non-aqueous solvent can be used as the solvent for the negative electrode mixture. A preferable example of the non-aqueous solvent is N-methyl-2-pyrrolidone (NMP). For the binder 730, any of the polymer materials shown as the examples of the binder 630 of the above-described positive electrode active material layer 223 (see FIG. 4) may be used. The above-mentioned examples of the polymer materials used as the binder 630 of the positive electrode active material layer 223 can also be used for the purpose of obtaining the function as an addition agent, such as a thickening agent for the positive electrode mixture, in addition to the function as the binder.

<<Separators 262 and 264>>

Each of the separators 262 and 264 is a member for separating the positive electrode sheet 220 and the negative electrode sheet 240 from each other, as illustrated in FIGS. 1 and 2. In this example, each of the separators 262 and 264 is made of a strip-shaped sheet having a plurality of micropores and having a predetermined width. For the separators 262 and 264, it is possible to use, for example, a single layer separator or a multi-layered separator, which is made of porous polyolefin-based resin. In this example, as illustrated in FIGS. 2 and 3, the width b1 of the negative electrode active material layer 243 is slightly wider than the width a1 of the positive electrode active material layer 223. In addition, the width c1, c2 of the separators 262 and 264 is slightly wider than the width b1 of the negative electrode active material layer 243 (c1, c2>b1>a1).

In the example shown in FIGS. 1 and 2, each of the separators 262 and 264 is made of a sheet-shaped member. Each of the separators 262 and 264 should be a member that insulates the positive electrode sheet 223 and the negative electrode sheet 243 from each other and at the same time permits transfer of electrolyte. Therefore, the separators are not limited to sheet-shaped members. In place of the sheet-shaped member, each of the separators 262 and 264 may be made of, for example, a layer of insulative particles that are formed on a surface of the positive electrode active material layer 223 or the negative electrode active material layer 243. The insulative particles may be made of an insulative inorganic filler (for example, a filler of metal oxide or metal hydroxide) or insulative resin particles (for example, particles of polyethylene or polypropylene).

<<Battery Case 300>>

In this example, as illustrated in FIG. 1, the battery case 300 is what is called a prismatic battery case, and it includes a case main body 320 and a lid 340. The case main body 320 has a closed-bottom quadrangular prismatic tubular shape, and is a flat-box-shaped case and whose one side face (upper face) is open. The lid 340 is a member that is attached to the opening of the case main body 320 (the opening in the upper face thereof) to close the opening.

For a secondary battery used for a vehicle, it is desired to improve the weight energy efficiency (the capacity of the battery per unit weight) in order to improve the fuel consumption of the vehicle. For this reason, a lightweight metal such as aluminum or an aluminum alloy (aluminum in this example) is employed for the case main body 320 and the lid 340, which constitute the battery case 300, in this embodiment. This enables to improve the weight energy efficiency.

The battery case 300 has a flat rectangular internal space as the space for accommodating the wound electrode assembly 200. As illustrated in FIG. 1, the flat internal space of the battery case 300 is slightly wider than the wound electrode assembly 200. In this embodiment, the battery case 300 has the case main body in a closed-bottom quadrangular prismatic tubular shape and the lid 340 closing the opening of the case main body 340. To the lid 340 of the battery case 300, electrode terminals 420 and 440 are attached. The electrode terminals 420 and 440 penetrate through the battery case 300 (the lid 340) and stick out outside the battery case 300. The lid 340 is provided with a filling port 350 and a safety vent 360.

Figure 6:
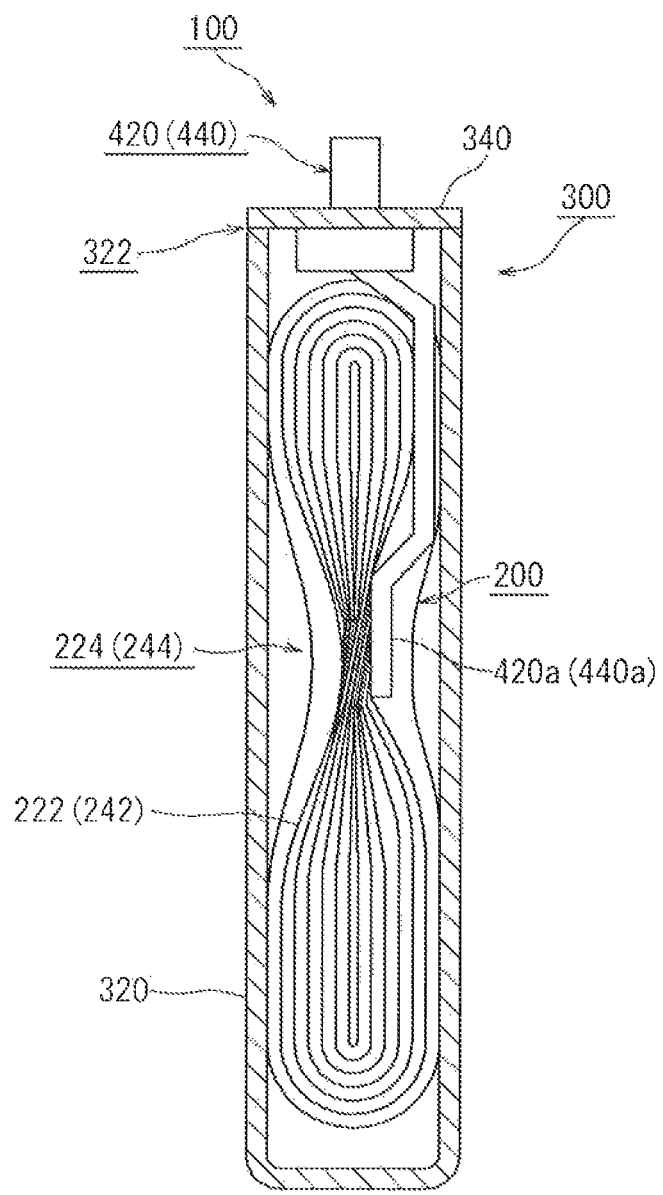
FIG. 6 is a side view illustrating a portion where an uncoated portion of the wound electrode assembly is welded to an electrode terminal.

As illustrated in FIG. 2, the wound electrode assembly 200 is deformed into a flat shape in one direction perpendicular to the winding axis WL. In the example shown in FIG. 2, the uncoated portion 222 of the positive electrode current collector 221 and the uncoated portion 242 of the negative electrode current collector 241 are exposed from the respective sides of the separators 262 and 264 in a spiral shape. As illustrated in FIG. 6, in this embodiment, the intermediate portions 224 and 244 of the uncoated portions 222 and 242 are gathered and welded to the foremost end portions 420a and 440a of the respective electrode terminals 420 and 440. In this case, from the viewpoint of the difference in materials, ultrasonic welding, for example, is used for welding the electrode terminal 420 to the positive electrode current collector 221. On the other hand, resistance welding, for example, is used for welding the electrode terminal 440 to the negative electrode current collector 241. Here, FIG. 6 is a side view illustrating the portion where the intermediate portion 224 (244) of the uncoated portion 222 (242) of the wound electrode assembly 200 is welded to the electrode terminal 420 (440), and it is also a cross-sectional view taken along line VI-VI in FIG. 1.

The wound electrode assembly 200 is attached to the electrode terminals 420 and 440 fixed to the lid 340 while it is pressed into a flat shape. As illustrated in FIG. 1, the wound electrode assembly 200 is accommodated in the flat internal space of the case main body 320. The case main body 320 is closed by the lid 340 after the wound electrode assembly 200 is placed therein. A joint portion 322 (see FIG. 1) between the lid 340 and the case main body 320 is welded and sealed by, for example, laser welding. Thus, in this example, the wound electrode assembly 200 is positioned in the battery case 300 by the electrode terminals 420 and 440 fixed to the lid 340 (i.e., the battery case 300).

<<Electrolyte Solution>>

Thereafter, an electrolyte solution is filled into the battery case 300 through the filling port 350 provided in the lid 340. What is called a non-aqueous electrolyte solution, which does not use water as the solvent, is used as the electrolyte solution. In this example, the electrolyte solution is an electrolyte solution in which $LiPF_6$ is contained at a concentration of about 1 mol/L in a mixed solvent of ethylene carbonate and diethyl carbonate (e.g., a mixed solvent with a volume ratio of about 1:1). Thereafter, a metal sealing cap 352 is attached (welded, for example) to the filling port 350 to seal the battery case 300. It should be noted that the electrolyte solution is not limited to the example of the electrolyte solution described herein. For example, any non-aqueous electrolyte solution that has conventionally been used for lithium-ion secondary batteries may be used as appropriate.

<<Pore>>

Here, the positive electrode active material layer 223 has tiny gaps 225, which may be called voids, for example, between the positive electrode active material particles 610 and the particles of the conductive agent 620 (see FIG. 4). The tiny gaps in the positive electrode active material layer 223 can be impregnated with the electrolyte solution (not shown). Also, the negative electrode active material layer 243 has tiny gaps, which may be called voids, for example, between the particles of the negative electrode active material particles 710 (see FIG. 5). Herein, such gaps (or voids) 225 and 245 are referred to as "pores" as appropriate. In addition, in the wound electrode assembly 200, the uncoated portions 222 and 242 are wound in a spiral form at the respective sides along the winding axis WL, as illustrated in FIG. 2. The electrolyte solution can infiltrate through the gaps in the uncoated portions 222 and 242 at the respective sides 252 and 254 along the winding axis WL. Thus, in the lithium-ion secondary battery 100, the electrolyte solution is impregnated throughout the positive electrode active material layer 223 and the negative electrode active material layer 243.

<<Gas Release Passage>>

In this example, the flat internal space of the battery case 300 is slightly wider than the wound electrode assembly 200 deformed in a flat shape. Gaps 310 and 312 are provided between the wound electrode assembly 200 and the battery case 300 at the respective sides of the wound electrode assembly 200. Each of the gaps 310 and 312 serves as a gas release passage. For example, when the temperature of the lithium-ion secondary battery 100 abnormally rises such as in the case of overcharging, it is possible that the electrolyte solution may be decomposed and gas may be generated abnormally. In this embodiment, the abnormally generated gas can move toward the safety vent 360 through the gaps 310 and 312 between the wound electrode assembly 200 and the battery case 300, and is discharged out of the battery case 300 from the safety vent 360.

In the lithium-ion secondary battery 100, the positive electrode current collector 221 and the negative electrode current collector 241 of the wound electrode assembly 200 are electrically connected to an external device via the electrode terminals 420 and 440 penetrating through the battery case 300. The operation of the lithium-ion secondary battery 100 during charge and during discharge will be described in the following.

<<Operation During Charge>>

Figure 7:
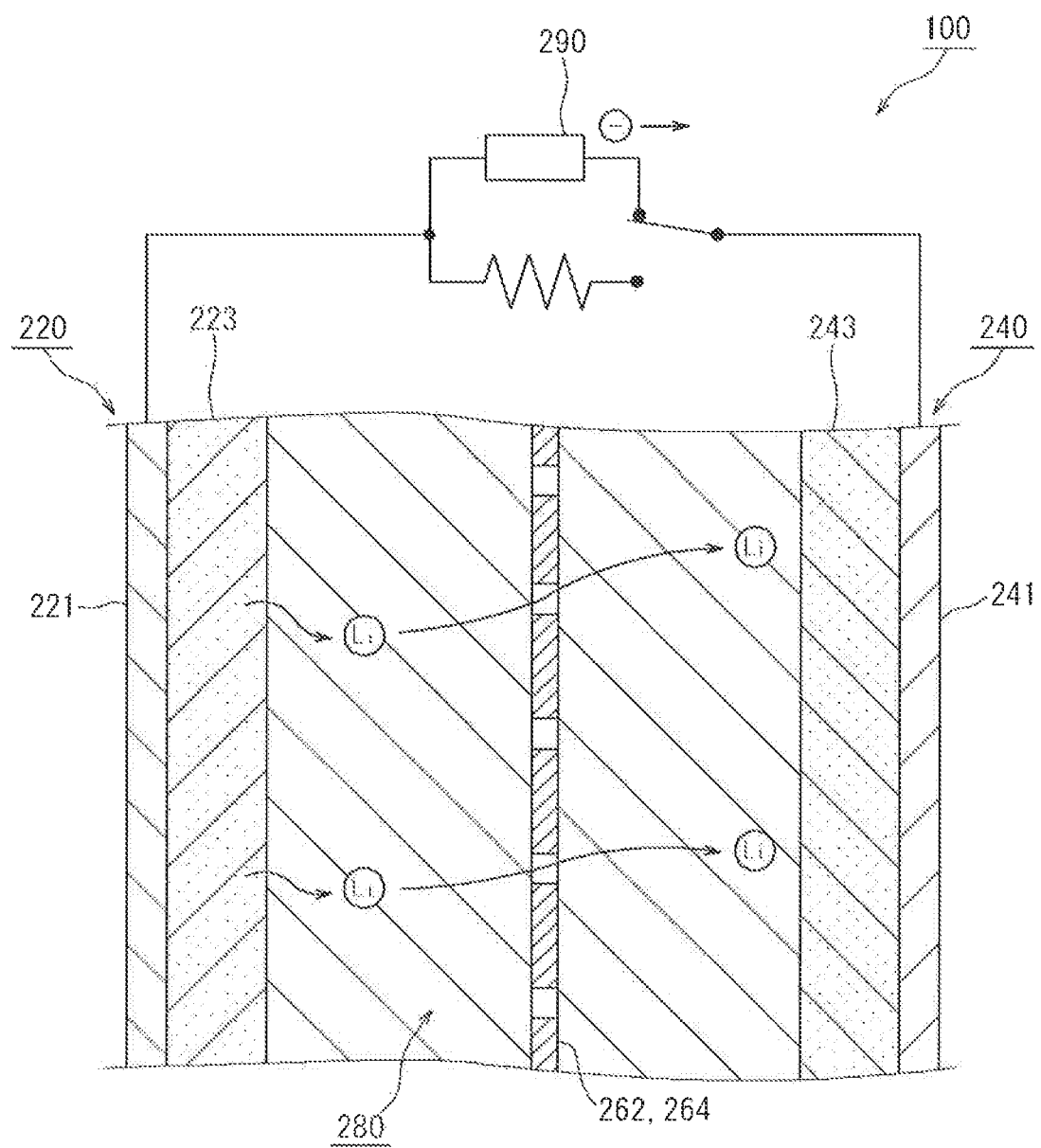
FIG. 7 is a view schematically illustrating a state of the lithium-ion secondary battery during charge.

FIG. 7 schematically illustrates the state of the lithium-ion secondary battery 100 during charge. During charge, the electrode terminals 420 and 440 (see FIG. 1) of the lithium-ion secondary battery 100 are connected to a charger 290, as illustrated in FIG. 7. By the working of the charger 290, lithium ions (Li) are released into the electrolyte solution 280 from the positive electrode active material in the positive electrode active material layer 223 during charge. In addition, electric charge is released from the positive electrode active material layer 223. The released electric charge is transferred through the conductive agent (not shown) to the positive electrode current collector 221 and further transferred through the charger 290 to the negative electrode sheet 240. In the negative electrode sheet 240, electric charge is stored, and also the lithium ions (Li) in the electrolyte solution 280 are absorbed and stored in the negative electrode active material within the negative electrode active material layer 243.

<<Operation During Discharge>>

Figure 8:
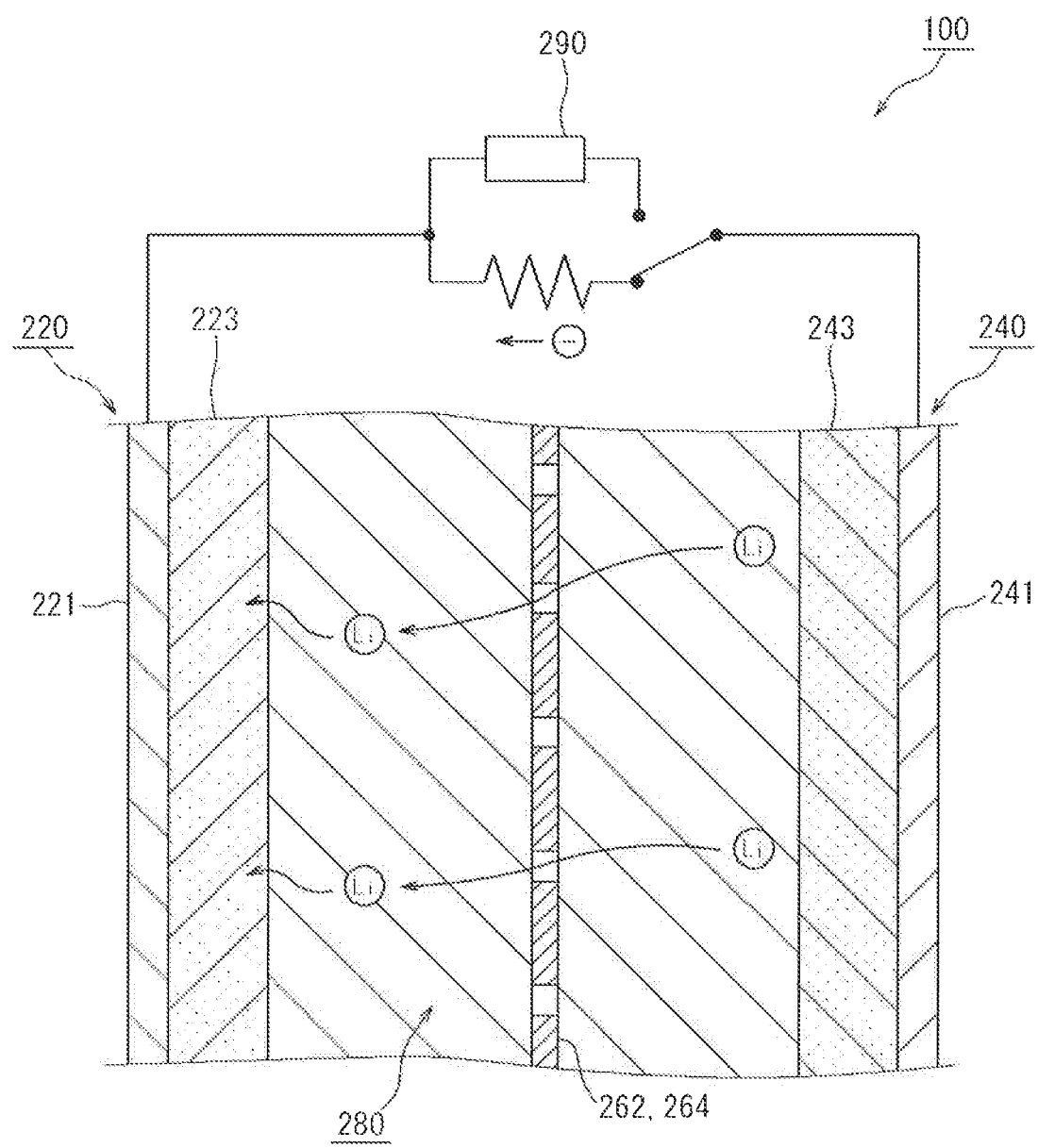
FIG. 8 is a view schematically illustrating a state of the lithium-ion secondary battery during discharge.

FIG. 8 schematically illustrates the state of the lithium-ion secondary battery 100 during discharge. During discharge, as illustrated in FIG. 8, electric charge is transferred from the negative electrode sheet 240 to the positive electrode sheet 220, and at the same time, the lithium ions stored in the negative electrode active material layer 243 are released into the electrolyte solution 280. Also, in the positive electrode, the lithium ions in the electrolyte solution 280 are absorbed into the positive electrode active material within the positive electrode active material layer 223.

Thus, in the charge and discharge of the lithium-ion secondary battery 100, lithium ions are transferred back and forth between the positive electrode active material layer 223 and the negative electrode active material layer 243 via the electrolyte solution 280. In addition, during charge, electric charge is transferred from the positive electrode active material through the conductive agent to the positive electrode current collector 221. On the other hand, during discharge, electric charge is returned from the positive electrode current collector 221 through the conductive agent to the positive electrode active material.

In the case of charge, when the transfer of lithium ions and the transfer of electrons take place more smoothly, it is believed possible to achieve more efficient and rapid charging. In the case of discharge, when the transfer of lithium ions and the transfer of electrons take place more smoothly, the resistance in the battery becomes lower and the amount of discharge becomes higher, so it is believed possible to improve the output power of the battery.

<<Other Battery Constructions>>

It should be noted that the foregoing merely shows one example of the lithium-ion secondary battery. The lithium-ion secondary battery is not limited to the foregoing embodiment. In addition, the electrode sheet in which an electrode mixture is coated on a metal foil may be used in various other types of battery constructions. For example, cylindrical batteries and laminate-type batteries are known as other types of battery constructions. The cylindrical battery is a battery in which a wound electrode assembly is enclosed in a cylindrical battery case. The laminate-type battery is a battery in which positive electrode sheets and negative electrode sheets are stacked on each other with separators interposed therebetween.

The present inventor has been investigating to use natural graphite, which is available at a lower cost than artificial graphite, mainly as the negative electrode active material for a lithium-ion secondary battery used as a vehicle-driving battery. The performance of natural graphite as the negative electrode active material of a lithium-ion secondary battery can be improved by coating natural graphite with an amorphous carbon film. However, when the natural graphite coated with an amorphous carbon film is used as the negative electrode active material particles, the resistance of the lithium-ion secondary battery tends to increase particularly in such applications that a charge-discharge process is repeated in a low-temperature environment at about −15° C.

Hereinbelow, a lithium-ion secondary battery according to one embodiment of the present invention will be described. The lithium-ion secondary battery described here has the same basic structure as that of the foregoing lithium-ion secondary battery 100. Therefore, the description will be made with reference to the drawings of the foregoing lithium-ion secondary battery 100 as appropriate.

<<Lithium-Ion Secondary Battery 100A>>

Figure 9:
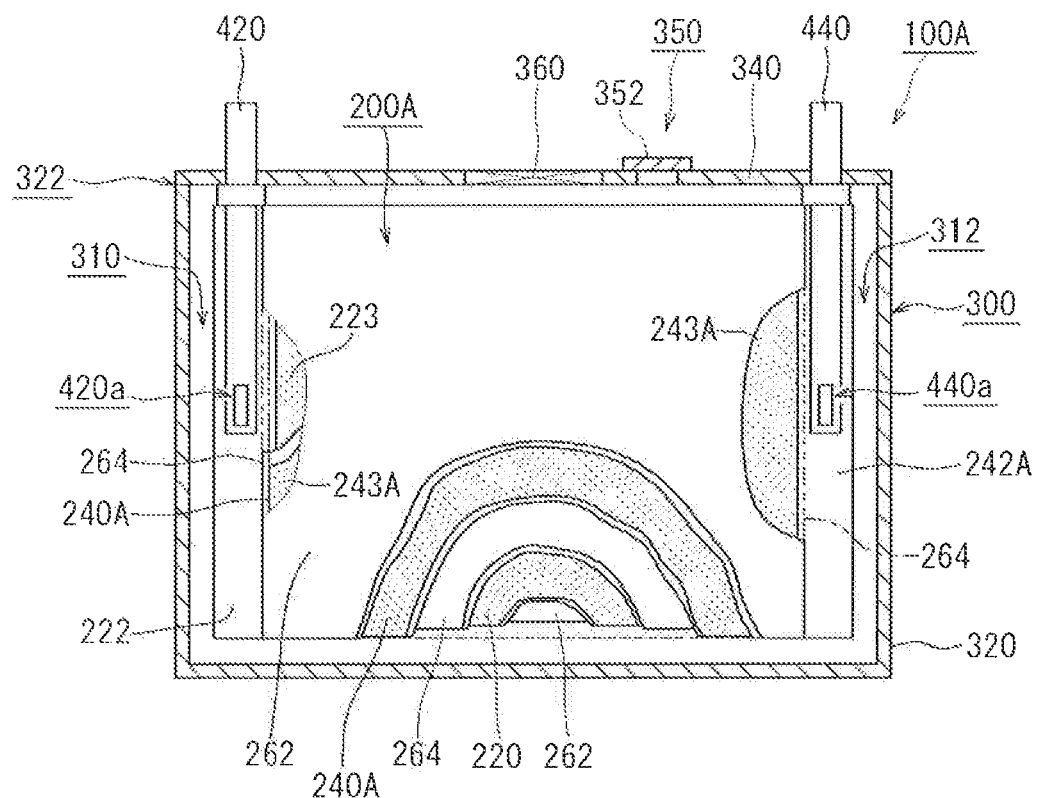
FIG. 9 is a view illustrating the structure of a lithium-ion secondary battery according to one embodiment of the present invention.
Figure 10:
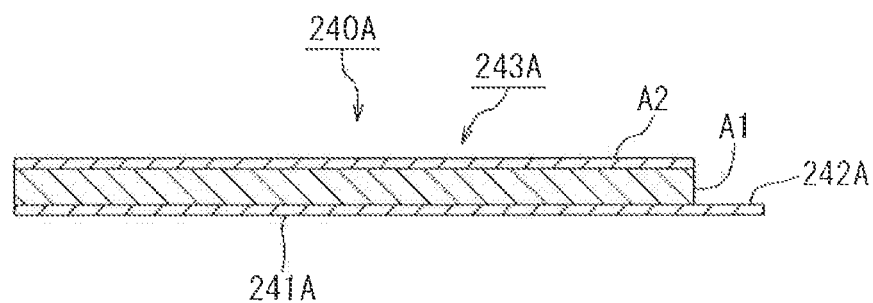
FIG. 10 is a cross-sectional view illustrating the negative electrode sheet in a lithium-ion secondary battery (sample 1) according to one embodiment of the present invention.

FIG. 9 illustrates a lithium-ion secondary battery 100A according to one embodiment of the present invention. Referring to FIG. 9, in one embodiment of the present invention, the structure of the negative electrode sheet 240A is different from that of the lithium-ion secondary battery 100 shown in FIG. 1. The uncoated portion of the negative electrode sheet 240A is denoted by reference character 242A. FIG. 10 illustrates a cross-sectional view of the negative electrode sheet 240A of the lithium-ion secondary battery 100A according to one embodiment of the present invention.

This lithium-ion secondary battery 100A has a negative electrode current collector 241A and a negative electrode active material layer 243A formed on the negative electrode current collector 241A. The negative electrode active material layer 243A contains a graphite material and a binder. The negative electrode active material layer 243A has a first region A1 neighboring the negative electrode current collector 241A. In the first region A1, the proportion of natural graphite is high in the graphite material. The negative electrode active material layer has a second region A2 neighboring a surface thereof. In the second region A2, the proportion of artificial graphite is high in the graphite material. This lithium-ion secondary battery 100A can keep the resistance increase small in such applications that a charge-discharge process is repeated in a low-temperature environment at about −15° C. Hereinbelow, the lithium-ion secondary battery 100A will be described in more detail.

<<Natural Graphite and Artificial Graphite>>

Natural graphite is a graphite material obtained by graphitization over many years of time in the natural world. In contrast, artificial graphite is a graphite material obtained by graphitization through industrial production. These graphite materials have a layered structure in which carbon hexagonal network planes are stacked to form a plurality of layers. In this case, during charge, lithium ions enter the space between the layers in the graphite material from the edge portions of the graphite material (the edge portions of the layers) and spread across the space between the layers.

<<Amorphous Carbon Film>>

In this embodiment, flake graphite particles (also referred to as flake graphite), for example, may be used as the natural graphite. In addition, the natural graphite may be at least partially covered with an amorphous carbon film. Here, the amorphous carbon film is a film made of an amorphous carbon material. For example, the natural graphite that is at least partially covered with the amorphous carbon film can be obtained by mixing pitch with natural graphite that serves as the core and baking the mixture.

Here, it is desirable that the weight ratio X of the amorphous carbon film in the natural graphite covered with the amorphous carbon film be approximately $0.01 \leq X \leq 0.10$. It is more preferable that the weight ratio X of the amorphous carbon film be $0.02 \leq X$. It is more preferable that the upper limit thereof be: $X \leq 0.08$, still more preferably $X \leq 0.06$. This makes it possible to obtain natural graphite that is appropriately covered by the amorphous carbon film. By using the natural graphite that is appropriately covered by the amorphous carbon film, side reactions between the electrolyte solution and the natural graphite can be prevented, and performance degradation of the lithium-ion secondary battery 100A can be prevented.

<<Negative Electrode Active Material Layer 243A>>

In this embodiment, the negative electrode active material layer 243A has a two-layer structure, as illustrated in FIG. 10. Herein, a layer of the negative electrode active material layer 243A that is neighboring the negative electrode current collector 241A is defined as the first region A1, and a layer thereof that is neighboring the surface of the negative electrode active material layer 243A is defined as the second region A2.

The first layer A1 of the negative electrode active material layer 243A that is neighboring the negative electrode current collector 241A mainly uses natural graphite as the negative electrode active material particles. The second layer A1 of the negative electrode active material layer 243A that is neighboring the surface of the negative electrode active material layer 243A mainly uses artificial graphite as the negative electrode active material particles.

<<Method of Forming Negative Electrode Active Material Layer 243A>>

In this embodiment, the method of forming the negative electrode active material layer 243A includes the following steps A through D.

In a step A, a first paste comprising a mixture of natural graphite, a binder, and a solvent is prepared.

In a step B, a second paste comprising a mixture of artificial graphite, a binder, and a solvent is prepared.

In a step C, the first paste prepared in the step A is coated onto a negative electrode current collector 241A.

In a step D, the second paste prepared in the step B is coated over the first paste coated on the negative electrode current collector 241A in the step C.

In this case, for example, the first paste comprising a mixture of natural graphite, a binder, and a solvent is coated onto the negative electrode current collector 241A in the step C. Then, after drying the first paste, the second paste comprising a mixture of artificial graphite, a binder, and a solvent is coated over the first paste in the step D. Then, after drying the second paste, the first paste and the second paste are pressure-rolled together. In this case, the coating of the first paste is carried out in the step C, and after drying the first paste, the coating of the second paste is carried out in the step D. Therefore, the first paste and the second paste are prevented from being mixed with each other.

At this time, the coated first paste may be pressure-rolled one time after drying the first paste and before the coating of the second paste. The first paste and the second paste may be slightly mixed with each other. For example, at least the surface of the first paste coated in the step C may be dried preliminarily, and thereafter, the second paste may be coated thereover. Alternatively, the coating of the second paste may be carried out successively after the coating of the first paste when the viscosity of the first paste and the second paste and the concentration of the solid content thereof may be adjusted so that the first paste and the second paste do not mix with each other actively.

In this embodiment, the first paste containing natural graphite is coated onto the negative electrode current collector 241A, and the second paste containing artificial graphite is coated over the first paste. It is desirable that the ratio of the thickness of the first region A1 in which the first paste is coated to the thickness of the second region A2 in which the second paste is coated be set to about 9:1, for example. That is, about 90% of the negative electrode active material layer 243A from the negative electrode current collector 241A uses natural graphite as the negative electrode active material, and the remaining about 10% of the negative electrode active material layer 243A neighboring the surface thereof uses artificial graphite as the negative electrode active material. In this case, there is a tendency that the capacity retention ratio after long-term storage can be maintained at a high level and at the same time the resistance increase after charge-discharge cycling in a low-temperature environment at about $-15°$ C. can be kept small.

The present inventor believes that this tendency is obtained for the following reason. That is, artificial graphite shows a higher purity and a lower resistance than natural graphite. Moreover, artificial graphite is more stable in quality than natural graphite. In the lithium-ion secondary battery 100A, a layer A1 of natural graphite is formed neighboring the negative electrode current collector 241A, and a layer A2 of artificial graphite is provided neighboring the surface of the negative electrode current collector 241A. As a result, while diffusing uniformly in the layer A2 of artificial graphite neighboring the surface of the negative electrode active material layer 243A, the lithium ions released from the natural graphite are released from the surface of the negative electrode active material layer 243A during discharge.

This reduces variations in the amount of the lithium ions released from the surface of the negative electrode active material layer 243A. The lithium ions are released more uniformly from the negative electrode active material layer 243A to the positive electrode active material layer 223. This makes it possible to maintain the capacity retention ratio after long-term storage at a high level and moreover keep the resistance increase in a low-temperature environment at about $-15°$ C. after charge-discharge cycling to be small.

<<Test Cell>>

The present inventor prepared a plurality of samples of the negative electrode sheet 240A differing in the structure of the negative electrode active material layer 243A. Then, using the respective negative electrode sheets 240A, test cells were prepared to evaluate direct current resistance, diffusion resistance, capacity retention ratio, and resistance increase rate. Herein, each of the test cells is a 18650-type battery having a rated capacity of 250 mAh.

<<Positive Electrode of the Test Cell>>

In the positive electrode of the test cell, a 15 µm-thick aluminum foil was used for the positive electrode current collector. The solid content of the positive electrode mixture prepared in forming the positive electrode active material layer was as follows: positive electrode active material:conductive agent:binder=88:10:2 in weight ratio. Particles of $LiNi_{1/3}Co_{1/3}Mn_{1/3}O_2$ (lithium-nickel-cobalt-manganese composite oxide) were used as the positive electrode active material, and the same positive electrode active material was used in all the test cells. Acetylene black was used as the conductive agent. Polyvinylidene fluoride (PVDF) was used as the binder.

<<Negative Electrode of the Test Cell>>

In the negative electrode of the test cell, a 10 µm-thick copper foil was used for the negative electrode current collector. The solid content of the negative electrode mixture prepared in forming the negative electrode active material layer was as follows: negative electrode active material:thickening agent:binder=98:1:1 in weight ratio. Here, carboxymethylcellulose (CMC) was used as the thickening agent. Styrene-butadiene rubber (SBR) was used as the binder.

<<Negative Electrode Sheet 240A of the Test Cell>>

The negative electrode sheet 240A is formed in the following manner. A paste, in which a negative electrode active material, a thickening agent, a binder, and a solvent are mixed together, is coated onto the negative electrode current collector 241. The article is then dried and pressure-rolled to form the negative electrode active material layer 243A. The test cells are subjected to predetermined conditioning at first.

<<Conditioning>>

The conditioning is carried out according to the following procedures 1 and 2.

Procedure 1: A test cell is charged with a constant current at 1 C to 4.1 V and thereafter rested for 5 minutes.

Procedure 2: After procedure 1, the test cell is charged with a constant voltage for 1.5 hours and then rested for 5 minutes.

<<Measurement of Rated Capacity>>

After the just-described conditioning, the rated capacity is measured for each of the test cells. The measurement of rated capacity is carried out according to the following procedures 1 through 3. Herein, in order to make the influence of temperature uniform, the rated capacity is measured in a temperature environment at a temperature of 25° C.

Procedure 1: A test cell is discharged with a constant current at 1 C to 3.0 V, then discharged with a constant voltage for 2 hours, and thereafter rested for 10 seconds.

Procedure 2: The test cell is charged with a constant current at 1 C to 4.1 V, then charged with a constant voltage for 2.5 hours, and thereafter rested for 10 seconds.

Procedure 3: The test cell is discharged with a constant current at 0.5 C to 3.0 V, then discharged with a constant voltage for 2 hours, and thereafter rested for 10 seconds.

Rated capacity: The discharge capacity (CCCV discharge capacity) obtained in the discharge process starting from the constant-current discharging and finishing with the constant-voltage discharging in Procedure 3 is defined as the rated capacity. In this test cell, the rated capacity is about 250 mAh.

<<SOC Adjustment>>

The SOC adjustment is carried out according to the following procedures 1 and 2. It is desirable to perform the SOC adjustment after the above-described conditioning process and the measurement of rated capacity. Herein, in order to make the influence of temperature uniform, the SOC adjustment is carried out in a temperature environment at a temperature of 25° C.

Procedure 1: A test cell is charged from 3 V with a constant current at 1 C so as to be in a state of charge of about 60% of the rated capacity (60% SOC).

Procedure 2: After procedure 1, the test cell is charged with a constant voltage for 2.5 hours.

This enables the test cell to be adjusted to a predetermined state of charge.

It should be noted that the state of charge of the test cell can be changed by adjusting the state of charge in procedure 1. For example, when 80% SOC is desired, the test cell may be brought into a state of charge of about 80% in the charging with a constant current in procedure 1.

<<Initial Capacity Q1>>

The initial capacity Q1 is measured according to the following procedures 1 through 3.

A test cell adjust to 80% SOC is prepared, and the test cell is charged with a constant current of 1 C under a temperature condition at 25° C. until the terminal voltage reaches 4.1 V. Subsequently, the test cell is further charged with a constant voltage of 4.1 V until the total charge time reaches 2.5 hours. (CC-CV charge.)

Procedure 2: After completion of the charge in procedure 1, the test cell is rested for 10 minutes and thereafter discharged with a constant current at 0.33 C to 3.0 V (CC discharge).

Procedure 3: After completion of the discharge in procedure 2, the test cell is rested for 10 minutes and thereafter charged with a constant voltage of 3.0 V until the total discharge time reaches 4 hours (CC-CV discharge).

Procedure 4: After completion of the CC-CV discharge in procedure 3, the test cell is rested for 10 minutes, and the capacity discharged through procedures 2 and 3 is employed as the initial capacity Q1 [Ah] of the test cell.

Next, the capacity retention ratio after 20-day storage and the resistance increase rate after −15° C. charge-discharge cycling were evaluated for each of the test cells.

<<Capacity Retention Ratio after 20-Day Storage>>

Each of the test cells adjusted to 80% SOC is placed under a temperature environment at 60° C. and set aside for 20 days. After such high-temperature storage, the test cells are subjected to the charging and discharging under a temperature condition of 25° C. under the same conditions as those used for obtaining the initial capacity Q1, and the capacity (battery capacity Q2 after high-temperature storage) at that time is obtained for each of the test cells. Then, the capacity retention ratio was calculated by the following expression:

$$\text{Capacity retention ratio} = (\text{Battery capacity } Q2 \text{ after high-temperature storage})/(\text{Initial capacity } Q1) \times 100 [\%].$$

<<Initial Resistance of the Test Cell>>

The initial resistance of each of the test cells was obtained as follows. Each of the test cells was adjusted to 60% SOC, then rested for 10 minutes, and discharged with a constant current of 30 C for 10 seconds. At this time, the voltage of the test cell drops because of the discharge, but the end-of-discharge voltage was set at 3.0 V. Then, based on the electric power discharged at this time, the resistance R obtained from the equation $V=IR (R=V/I)$ was defined as the initial resistance $R_0$.

<<Resistance Increase Rate after −15° C. Charge-Discharge Cycling>>

Test cells are prepared that are adjusted to 60% SOC in a temperature environment of −15° C. Here, the following procedures 1 and 2 are taken as one cycle, and 3000 cycles are performed. At this time, the test cells are adjusted to 60% SOC at every 500 cycles.

Procedure 1: The test cell is discharged with a constant current of 30 C for 10 seconds and then rested for 10 minutes.

Procedure 2: The test cell is charged with a constant current of 5 C for 2 minutes (120 seconds) and then rested for 10 minutes.

Then, the resistance of each of the test cells is measured after 3000 cycles. Here, the resistance of each of the test cells was obtained as follows, according to the measurement of the initial resistance. Each of the test cells was adjusted to 60% SOC, then rested for 10 minutes, and discharged with a constant current of 30 C for 10 seconds. At this time, the voltage of the test cell drops because of the discharge, but the end-of-discharge voltage was set at 3.0 V. Then, based on the electric power discharged at this time, the resistance R obtained from the equation $V=IR (R=V/I)$ was defined as the post-cycling resistance $R_{3000}$. Then, the resistance increase rate after −15° C. charge-discharge cycling was obtained by: (Post-cycling resistance $R_{3000}$)/(Initial resistance $R_0$). It is desirable that the initial resistance of the test cell employed here should be the value measured under a temperature environment of −15° C., as in the case with the post-cycling resistance $R_{3000}$.

$$\text{Resistance increase rate after } -15° \text{C. charge-discharge cycling} = (\text{Post-cycling resistance } R_{3000})/(\text{Initial resistance } R_0) \times 100 [\%]$$

<<Samples and Evaluation Thereof>>

The present inventor prepared a plurality of test cells differing in the structure of the negative electrode active material layer 243A. Table 1 shows typical examples thereof. The structure of the negative electrode active material layer 243A in each of the test cells shown in Table 1 is as follows.

Here, a first paste containing natural graphite as the negative electrode active material, a second paste containing artificial graphite as the negative electrode active material, and a third paste containing natural graphite and artificial graphite mixed at a predetermined ratio were prepared. Then, using the first paste, the second paste, and the third paste appropriately, negative electrode sheets 240A differing in the structure of the negative electrode active material layer 243A were prepared. The test cells are manufactured under the same conditions except for the structure of the negative electrode active material layer 243A in the negative electrode sheet 240A. For example, the basis weight of the negative electrode active material layer and the weight ratio of the graphite materials in the negative electrode active material layer are set to be substantially the same between the samples.

<<Sample 1>>

Sample 1 uses natural graphite as the negative electrode active material in the first region A1 of the negative electrode active material layer 243A that is neighboring the negative electrode current collector 241A. It also uses artificial graphite as the negative electrode active material in the second region A2 of the negative electrode active material layer 243A that is neighboring the surface thereof. That is, in this test cell, the first paste containing natural graphite as the negative electrode active material was coated onto the negative electrode current collector 241A, and thereafter, the second paste containing artificial graphite as the negative electrode active material was coated over the first paste. In sample 1, the first region A1, which uses natural graphite, is 90% of the negative electrode active material layer 243A, and the second region A2, which uses artificial graphite, is 10% of the negative electrode active material layer 243A.

It should be noted that, even in this case, natural graphite does not need to be 100% of the graphite material contained in the first region A1, and artificial graphite does not need to be 100% of the graphite material contained in the second region A2.

<<Sample 2>>

Figure 11:
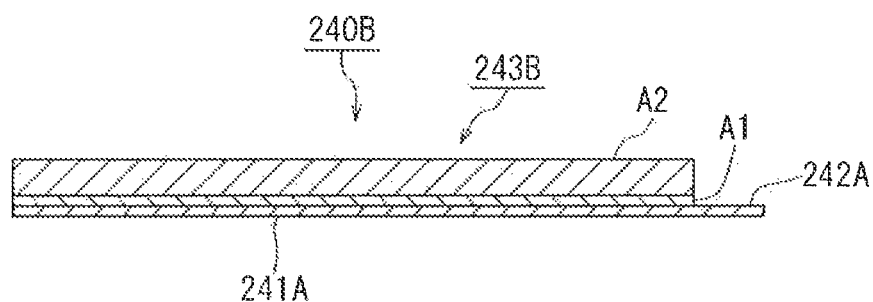
FIG. 11 is a cross-sectional view illustrating the negative electrode sheet in sample 2.

Sample 2 uses artificial graphite as the negative electrode active material in the first region A1 of its negative electrode active material layer 243B that is neighboring the negative electrode current collector 241A. It also uses natural graphite as the negative electrode active material in the second region A2 of the negative electrode active material layer 243B that is neighboring the surface thereof. That is, in this test cell, the second paste containing artificial graphite as the negative electrode active material was coated onto the negative electrode current collector 241A, and thereafter, the first paste containing natural graphite as the negative electrode active material was coated over the second paste. Herein, FIG. 11 shows a cross-sectional view of a negative electrode sheet 240B of the test cell of sample 2. In sample 2, as illustrated in FIG. 11, the thickness of the first region A1, which uses artificial graphite, is set to 10% of the negative electrode active material layer 243B. In contrast, the second region A2, which uses natural graphite, is set to 90% of the negative electrode active material layer 243B.

<<Sample 3>>

Figure 12:
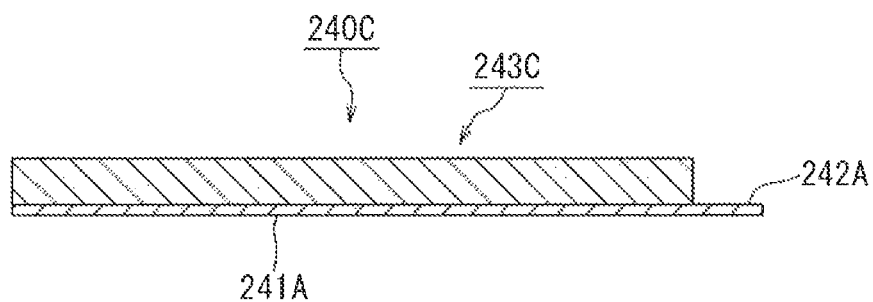
FIG. 12 is a cross-sectional view illustrating the negative electrode sheet in samples 3 to 5.

FIG. 12 shows a cross-sectional view of a negative electrode sheet 240C for the test cells of samples 3 to 5, whose negative electrode active material layer 243C has a single layer structure. Sample 3 uses natural graphite as the negative electrode active material in the negative electrode active material layer 243C. That is, in this test cell, the first paste containing natural graphite as the negative electrode active material is coated on the negative electrode current collector 241A. Thus, natural graphite is used as the negative electrode active material in both the region neighboring the negative electrode current collector 241A and the region neighboring the surface.

<<Sample 4>>

Sample 4 uses artificial graphite as the negative electrode active material in the negative electrode active material layer 243C. That is, in this test cell, the second paste containing artificial graphite as the negative electrode active material is coated on the negative electrode current collector 241A. Thus, artificial graphite is used as the negative electrode active material in both the region neighboring the negative electrode current collector 241A and the region neighboring the surface.

<<Sample 5>>

Sample 5 uses a mixture of natural graphite and artificial graphite as the negative electrode active material in the negative electrode active material layer 243C. That is, in this test cell, the third paste containing natural graphite and artificial graphite mixed at a predetermined ratio as the negative electrode active material is coated on the negative electrode current collector 241A. Thus, natural graphite and artificial graphite are mixed together both in the region neighboring the negative electrode current collector 241A and in the region neighboring the surface. In this case, the ratio of natural graphite and artificial graphite is determined by the mixing ratio of the natural graphite and the artificial graphite mixed in the third paste. In sample 5 here, natural graphite is 90% and artificial graphite is 10% in the weight ratio of the negative electrode active material.

It should be noted that the natural graphite used here is natural flake graphite. This natural graphite is covered with an amorphous carbon film. The BET specific surface area of this natural graphite was 2.6 m$^2$/g. The BET specific surface area of this artificial graphite was 2.7 m$^2$/g.

TABLE 1

| | First region A1 neighboring current collector | Second region A2 neighboring surface | Capacity retention ratio after 20-day storage | Resistance increase rate after −15° C. charge-discharge cycling |
|---|---|---|---|---|
| Sample 1 | Natural graphite | Artificial graphite | 89.3 | 105.5 |
| Sample 2 | Artificial graphite | Natural graphite | 89.2 | 125.9 |
| Sample 3 | Natural graphite | | 86.7 | 121.5 |
| Sample 4 | Artificial graphite | | 93.5 | 147.7 |
| Sample 5 | Natural graphite + Artificial graphite | | 89.1 | 124.2 |

Table 1 shows the structure of the negative electrode active material layer 243A, the capacity retention ratio after 20-day storage, and the resistance increase rate after −15° C. charge-discharge cycling, for samples 1 through 5. As shown in Table 1, sample 3, which uses natural graphite alone as the negative electrode active material, shows a capacity retention ratio after 20-day storage of 86.7%, which means that the capacity retention ratio is low. On the other hand, sample 4, which uses artificial graphite alone as the negative electrode, shows a capacity retention ratio after 20-day storage of 93.5%, which means that the capacity is maintained at a high level. However, sample 4 shows a resistance increase rate after −15° C. charge-discharge cycling of 147.7%, which means that the resistance increase after charge-discharge cycling in a low-temperature environment tends to be considerably high.

Sample 5, which uses natural graphite and artificial graphite at a predetermined ratio as the negative electrode active material, shows a capacity retention ratio after 20-day storage of 89.1%. The capacity is kept higher than that of sample 3, in which natural graphite alone is used. However, sample 5 shows a resistance increase rate after −15° C. charge-discharge cycling of 124.2%, which means that the resistance increase after charge-discharge cycling in a low-temperature environment tends to be high.

As illustrated in FIG. 11, sample 2 uses artificial graphite as the negative electrode active material in the first region A1 neighboring the negative electrode current collector 241A, and uses natural graphite as the negative electrode active material in the second region A2 neighboring the surface of the negative electrode active material layer 243B. The capacity retention ratio after 20-day storage of sample 2 was 89.2%. The capacity of sample 2 is kept higher than that of sample 3, in which natural graphite alone is used. However, sample 2 shows a resistance increase rate after −15° C. charge-discharge cycling of 125.9%, which means that the resistance increase after charge-discharge cycling in a low-temperature environment tends to be high.

In contrast, sample 1 uses natural graphite as the negative electrode active material in the first region A1 neighboring the negative electrode current collector 241A, and uses artificial graphite as the negative electrode active material in the second region A2 neighboring the surface of the negative electrode active material layer 243B, as illustrated in FIG. 10. The capacity retention ratio after 20-day storage of sample 1 was 89.3%. The capacity of sample 1 is kept higher than that of sample 3, in which natural graphite alone is used, although not as high as that of sample 4, in which artificial graphite alone is used. Moreover, sample 1 shows a resistance increase rate after −15° C. charge-discharge cycling of 105.5%, which means that the resistance increase after charge-discharge cycling in a low-temperature environment can be kept considerably low.

Thus, when judging the capacity retention ratio after 20-day storage (the capacity retention ratio after long-term storage) and the resistance increase rate after −15° C. charge-discharge cycling (the resistance increase rate after charge-discharge cycling under a low-temperature environment) comprehensively, sample 1 is superior to any of other samples 2 to 5. For example, in the case of passenger cars, a large proportion of users use their cars only on weekends, and moreover, it is necessary to consider the use in cold climate regions as well. For this reason, the structure of sample 1 is suitable for use for a vehicle drive battery since sample 1 can maintain the capacity retention ratio after long-term storage at a high level and can also keep the resistance increase rate after charge-discharge cycling under a low-temperature environment to be considerably low.

The present inventor prepared test cells in differing in the structure of the negative electrode active material layer 243A based on the structure of sample 1 to evaluate the capacity retention ratio after 20-day storage and the resistance increase rate after −15° C. charge-discharge cycling.

Sample 1 uses natural graphite as the negative electrode active material in the first region A1 of the negative electrode active material layer 243A that is neighboring the negative electrode current collector 241A. It also uses artificial graphite as the negative electrode active material in the second region A2 of the negative electrode active material layer 243A that is neighboring the surface thereof. In sample 1, the thickness of the first region A1, which uses natural graphite, is 90% of the negative electrode active material layer 243A, and the thickness of the second region A2, which uses artificial graphite, is 10% of the negative electrode active material layer 243A.

<<Thickness Ratio of the Layer of Natural Graphite and the Layer of Artificial Graphite>>

In preparing such an electrode active material layer 243A of the test cell, it is advisable to coat the first paste containing natural graphite as the negative electrode active material onto the negative electrode current collector and thereafter coat the second paste containing artificial graphite as the negative electrode active material over the first paste. It is possible to vary the thickness ratio of the layer of natural graphite and the layer of artificial graphite in the negative electrode active material layer 243A, by adjusting the amount of the first paste to be coated and the amount of the second paste to be coated.

Figure 13:
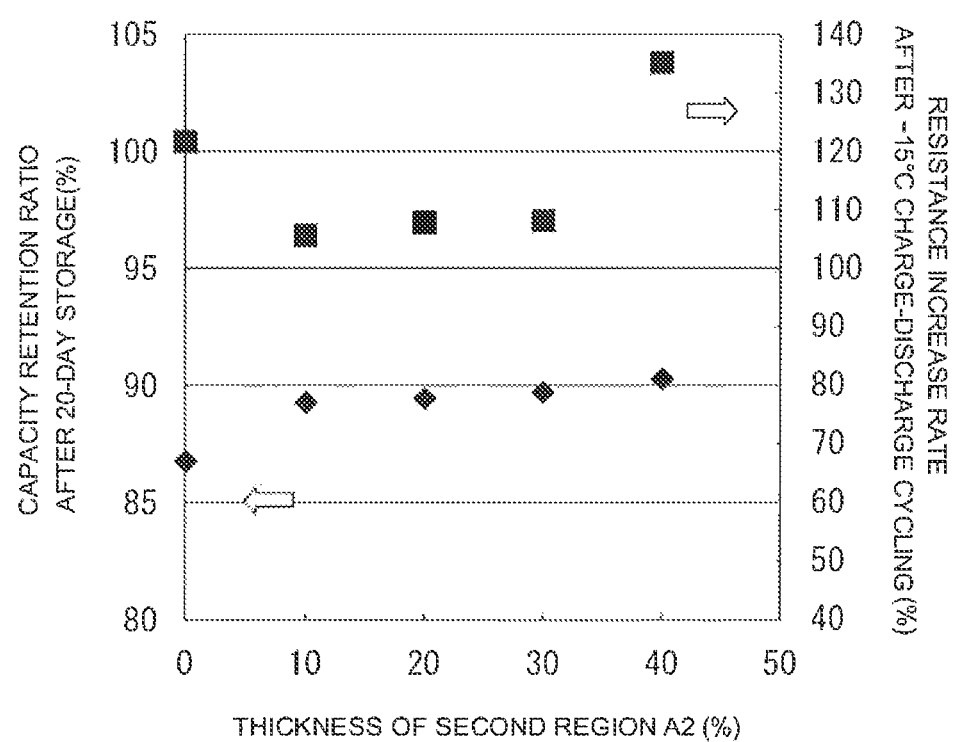
FIG. 13 is a graph in which the capacity retention ratio after 20-day storage and the resistance increase rate after −15° C. charge-discharge cycling are evaluated for samples having varying proportions of the second region A2.

The present inventor prepared test cells of sample 1 that differ in the thickness ratio of the layer of natural graphite (the first region A1 herein) and the layer of artificial graphite (the second region A2 herein) in the negative electrode active material layer 243A. Then, the capacity retention ratio after 20-day storage and the resistance increase rate after −15° C. charge-discharge cycling were evaluated for each of the prepared test cells. The basis weight of the negative electrode active material layer and the weight ratio of the graphite materials in the negative electrode active material layer were set to be substantially the same between the test cells. FIG. 13 shows the results.

In FIG. 13, each of the diamond-shaped plots ♦ represents the capacity retention ratio after 20-day storage, and each of the square-shaped plots ■ represents the resistance increase rate after −15° C. charge-discharge cycling. In this case, it was confirmed that when the layer of artificial graphite coated in the region neighboring the surface of the negative electrode active material layer 243A (i.e., the thickness of the second region A2) is from about 10% to about 30% from the surface of the negative electrode active material layer 243A, the capacity retention ratio after 20-day storage (the capacity retention ratio after long-term storage) can be maintained at a high level, as shown in FIG. 13. Moreover, it was also confirmed that the resistance increase rate after −15° C. charge-discharge cycling (the resistance increase rate after charge-discharge cycling in a low-temperature environment) can be kept low.

<<BET Specific Surface Area of Artificial Graphite>>

Figure 14:
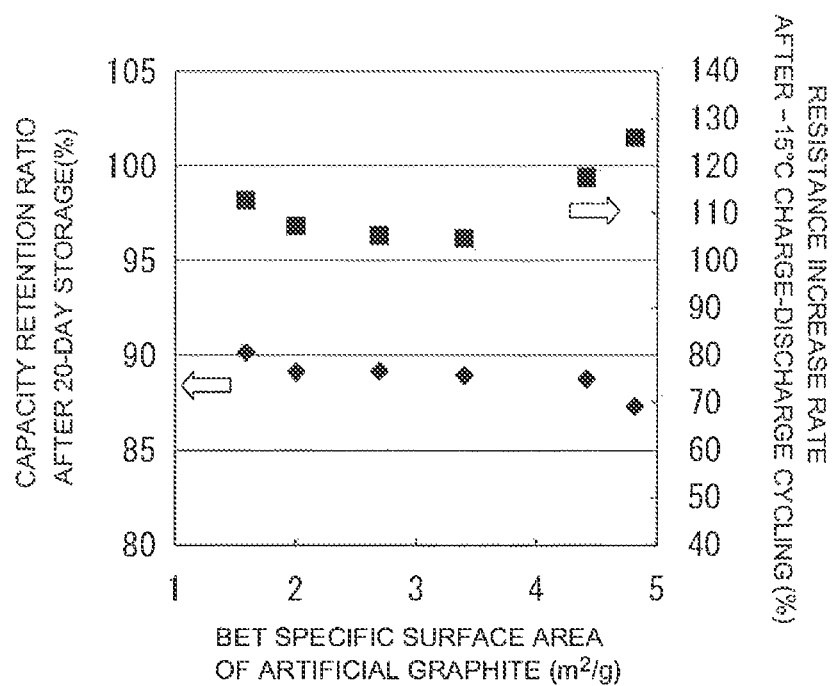
FIG. 14 is a graph in which the capacity retention ratio after 20-day storage and the resistance increase rate after −15° C. charge-discharge cycling are evaluated for samples having varying BET specific surface areas of artificial graphite.

The present inventor also prepared a plurality of test cells of sample 1 that differ the BET specific surface area (m$^2$/g) of artificial graphite. In this case, a plurality of second pastes are prepared using artificial graphite materials differing in BET specific surface area. Then, for each test cell, the first paste containing natural graphite as the negative electrode active material is coated onto the negative electrode current collector, and thereafter, the second paste containing artificial graphite as the negative electrode active material is coated over the first paste. Thus, it is possible to prepare the test cells differing in BET specific surface area of artificial graphite contained in the second region A2 neighboring the surface. Here, the capacity retention ratio after 20-day storage and the resistance increase rate after −15° C. charge-discharge cycling were evaluated for each of the prepared test cells. FIG. 14 shows the results.

In FIG. 14, each of the diamond-shaped plots ♦ represents the capacity retention ratio after 20-day storage. Each of the square-shaped plots ■ represents the resistance increase rate after −15° C. charge-discharge cycling. In this case, it was confirmed that when the artificial graphite coated for the second region A2 of the negative electrode active material layer 243A that is neighboring the surface has a BET specific surface area of from about 1.8 m²/g to about 4.0 m²/g, more preferably from 2.0 m²/g to 3.4 m²/g, the capacity retention ratio after 20-day storage can be maintained at a high level and moreover the resistance increase rate after −15° C. charge-discharge cycling can be kept low. That is, it is desirable that the artificial graphite coated for the second region A2 neighboring the surface have a BET specific surface area of from about 1.8 m²/g to about 4.0 m²/g. This makes it possible to maintain the capacity retention ratio after long-term storage at a high level and also keep the resistance increase during continuous discharging to be small. In particular, it is possible to keep the resistance increase rate to be low in the applications in which a charge-discharge process is repeated under a low-temperature environment.

In this case, when the BET specific surface area of the artificial graphite is about 1.8 m²/g or greater, the resistance increase rate after −15° C. charge-discharge cycling can be kept low. However, when the BET specific surface area of the artificial graphite becomes about 4.4 m²/g or greater, the resistance increase rate after −15° C. charge-discharge cycling becomes high.

<<BET Specific Surface Area of Natural Graphite>>

Figure 15:
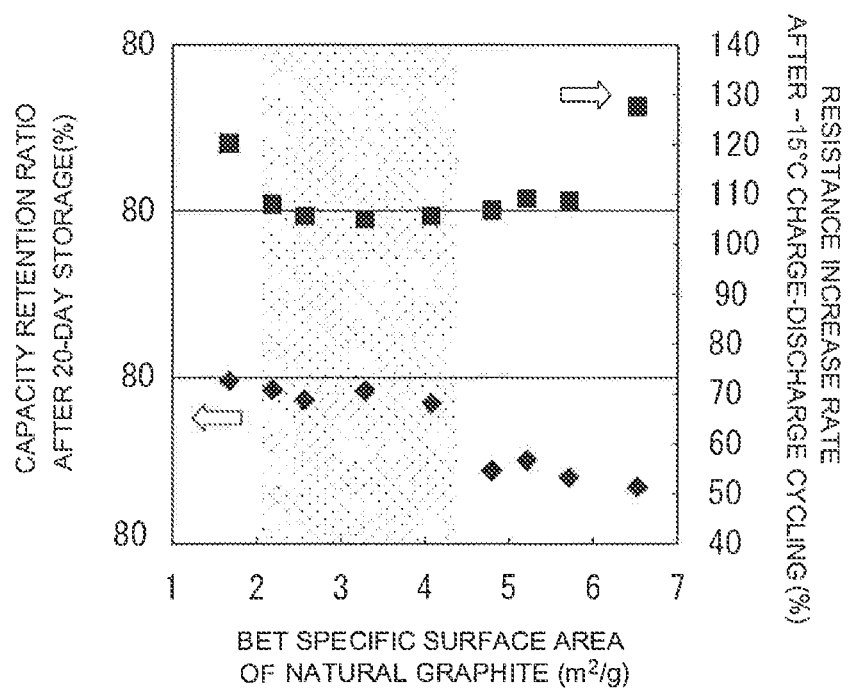
FIG. 15 is a graph in which the capacity retention ratio after 20-day storage and the resistance increase rate after −15° C. charge-discharge cycling are evaluated for samples having varying BET specific surface areas of natural graphite.

The present inventor also prepared a plurality of test cells of sample 1 that differ in BET specific surface area (m²/g) of natural graphite. In this case, a plurality of first pastes are prepared using natural graphite materials differing in BET specific surface area. Then, for each test cell, the prepared first paste is coated onto the negative electrode current collector, and thereafter, the second paste is coated over the first paste. Thus, it is possible to prepare the test cells differing in BET specific surface area of natural graphite contained in the first region A1 neighboring the negative electrode current collector 241A. Here, the capacity retention ratio after 20-day storage and the resistance increase rate after −15° C. charge-discharge cycling were evaluated for each of the prepared test cells. FIG. 15 shows the results.

In FIG. 15, each of the diamond-shaped plots ♦ represents capacity retention ratio after 20-day storage, and each of the square-shaped plots ■ represents the resistance increase rate after −15° C. charge-discharge cycling. In this case, it was confirmed that when the natural graphite coated for the first region A1 of the negative electrode active material layer 243A that is neighboring the negative electrode current collector 241A has a BET specific surface area of from about 2.0 m²/g to about 4.5 m²/g, preferably from about 2.2 m²/g to about 4.1 m²/g, the capacity retention ratio after 20-day storage can be maintained at a high level and moreover the resistance increase rate after −15° C. charge-discharge cycling can be kept low. That is, it is desirable that the natural graphite coated for the first region A1 neighboring the negative electrode current collector 241A have a BET specific surface area of from about 2.0 m²/g to about 4.5 m²/g. This makes it possible to maintain the capacity retention ratio after long-term storage at a high level and also keep the resistance increase during continuous discharging to be small. In particular, it is possible to keep the resistance increase rate to be low in the applications in which a charge-discharge process is repeated under a low-temperature environment.

In this case, when the BET specific surface area of the natural graphite is about 2.2 m²/g or greater, the resistance increase rate after −15° C. charge-discharge cycling can be kept low. When focusing on the effect of keeping the resistance increase rate after −15° C. charge-discharge cycling to be low, it is desirable that the natural graphite have a BET specific surface area of from about 2.2 m²/g to about 5.7 m²/g. When taking into consideration the effect of maintaining the capacity retention ratio after 20-day storage at a high level, it is desirable that the natural graphite have a BET specific surface area of from about 2.2 m²/g to about 4.1 m²/g.

Thus, the lithium-ion secondary battery 100A according to one embodiment of the present invention has a negative electrode current collector 241A and a negative electrode active material layer 243A formed on the negative electrode current collector 241A, as illustrated in FIG. 10. The negative electrode active material layer 243A may contain a graphite material and a binder.

In the above-described embodiment, natural graphite is used as the graphite material in the first region A1 of the negative electrode active material layer 243A that is neighboring the negative electrode current collector 241A. In addition, artificial graphite is used as the graphite particles in the second region A2 of the negative electrode active material layer 243A that is neighboring the surface thereof. This makes it possible to maintain the capacity retention ratio after long-term storage at a high level and also keep the resistance increase during continuous discharging to be small. In particular, it is possible to keep the resistance increase rate to be low in the applications in which a charge-discharge process is repeated under a low-temperature environment.

Here, natural graphite may not necessarily consist of 100% of the graphite material in the first region A1. Also, artificial graphite may not necessarily consist of 100% of the graphite material in the second region A1. In other words, the graphite material of the first region A1 and the graphite material of the second region A2 can be slightly mixed with each other in the manufacturing process. Even in that case, it is sufficient as long as it is possible to obtain the effect of maintaining the capacity retention ratio after long-term storage at a high level and keeping the resistance increase rate to be low in the applications in which a charge-discharge process is repeated under a low-temperature environment.

Accordingly, it is desirable that the weight ratio of natural graphite be about 80% or greater, more desirably 85% or greater, for example, or still more desirably 90% or greater, for example, in the first region A1 of the negative electrode active material layer 243A that is neighboring the negative electrode current collector 241A. Likewise, it is desirable that the weight ratio of artificial graphite be about 80% or greater, more desirably 85% or greater, for example, or still more desirably 90% or greater, for example, in the second region A2 of the negative electrode active material layer 243A that is neighboring the surface thereof. In this way, it is possible that the first region A1 may somewhat contain a graphite material (for example, artificial graphite) other than natural graphite. Likewise, it is possible that the second region A2 may somewhat contain a graphite material (for example, natural graphite) other than artificial graphite.

In addition, in the foregoing embodiment, the first region A1 of the negative electrode active material layer 243A that is neighboring the negative electrode current collector 241A is a region of the negative electrode active material layer 243A excluding the second region of the negative electrode active material layer 243A that is neighboring the surface thereof, as illustrated in FIG. 10. The negative electrode active material layer 243A has a two-layer structure. Therefore, the lithium-ions released from the natural graphite in the first region A1 is released through the artificial graphite in the second region A2 toward the positive electrode active material layer 223. The surface of the negative electrode active material layer 243A is covered with the layer of artificial graphite. Therefore, lithium ions are released substantially uniformly from the surface of the negative electrode active material layer 243A. This enables lithium ions to migrate into the positive electrode active material layer 223 smoothly. Moreover, because the layer of artificial graphite is formed over the surface of the negative electrode active material layer 243A, the entry and diffusion of lithium ions into the negative electrode active material layer 243A are carried out smoothly. As a result, the resistance increase rate after charge-discharge cycling under a low-temperature environment can be kept low.

In the foregoing embodiment, the natural graphite contained in the first region A1 is, as a preferred embodiment, at least partially covered with an amorphous carbon film. The natural graphite may not necessarily be covered with an amorphous carbon film. By using the natural graphite covered with the amorphous carbon film, side reactions between the electrolyte solution and the natural graphite can be inhibited, and the capacity deterioration of the lithium-ion secondary battery 100A can be prevented.

As a method of manufacturing the lithium-ion secondary battery 100A, it is advisable to coat the second paste comprising a mixture of artificial graphite, a binder, and a solvent onto the negative electrode current collector on which the first past comprising a mixture of natural graphite, a binder, and a solvent has been coated, so as to be over the coating layer of the first paste. In this case, examples of the method of coating with the first paste and the second paste include the methods using various coating techniques (such as comma coater, die-coater, and gravure printing techniques).

The coating with the first paste and that with the second paste may be carried out by the same method. In particular, the first paste is applied thick, and the second paste is applied thinly thereover herein. Therefore, it is possible to use a coating technique more suitable for thick coating (such as comma coater or die-coater) for the manufacturing step of coating with the first paste, and use a coating technique more suitable for thin coating (such as a gravure printing technique) for the manufacturing step of coating with the second paste.

Hereinabove, the lithium-ion secondary battery 100A according to one embodiment of the present invention and the method of manufacturing the battery has been described, but the lithium-ion secondary battery according to the present invention is not limited by any of the foregoing embodiments.

As described above, the lithium-ion secondary battery 100A according to one embodiment of the present invention contributes to an improvement in the capacity retention ratio after long-term storage of lithium-ion secondary batteries and an improvement in the charge-discharge cycle performance thereof under a low-temperature environment. Therefore, the lithium-ion secondary battery 100A is suitable for secondary batteries for vehicle-driving power sources, such as batteries for driving hybrid vehicles, which require a high level of capacity retention ratio after long-term storage and a high level of charge-discharge cycle performance under a low-temperature environment, and batteries for driving plug-in hybrid vehicles and electric vehicles, which require a particularly high level of capacity.

Figure 16:
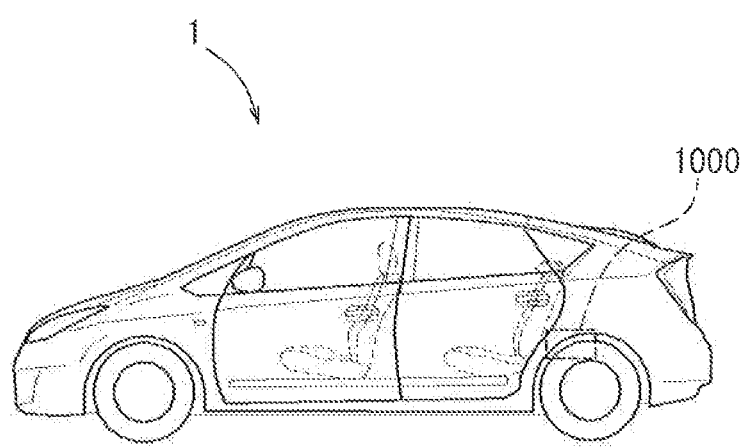
FIG. 16 is a view illustrating a vehicle incorporating a secondary battery.

In this case, as illustrated in FIG. 16, the present invention can be suitably utilized as a vehicle drive battery 1000 in the form of a battery module, in which a plurality of secondary batteries are connected and combined. The lithium-ion secondary battery 100A is suitable for, for example, a lithium-ion secondary battery having a rated capacity of 3.0 Ah or higher, which is suitable for a drive battery for a hybrid vehicle (particularly for a plug-in hybrid vehicle) or an electric vehicle.

REFERENCE SIGNS LIST

1—Vehicle
100, 100A—Lithium-ion secondary battery
200, 200A—Wound electrode assembly
220—Positive electrode sheet
221—Positive electrode current collector
222—Uncoated portion
223—Positive electrode active material layer
224—Intermediate portion
225—Gap
240, 240A, 240B, 240C—Negative electrode sheet
241, 241A—Negative electrode current collector
242, 242A—Uncoated portion
243, 243A, 243B, 243C—Negative electrode active material layer
245—Gap
252, 254—Sides along winding axis WL of wound electrode assembly
262, 264—Separator
280—Electrolyte solution
290—Charger
300—Battery case
310, 312—Gap
320—Case main body
322—Joint portion between lid and case main body
340—Lid
350—Filling port
352—Sealing cap
360—Safety vent
420—Electrode terminal
420a—Foremost end portion of electrode terminal 420
440—Electrode terminal
440a—Foremost end portion of electrode terminal 440
610—Positive electrode active material particle
620—Conductive agent
630—Binder
710—Negative electrode active material particle
730—Binder
1000—Vehicle drive battery
A1—First region
A2—Second region
WL—Winding axis

The invention claimed is:

1. A lithium-ion secondary battery comprising:
a negative electrode current collector; and
a negative electrode active material layer formed on the negative electrode current collector, wherein:
the negative electrode active material layer contains a graphite material and a binder;
the negative electrode active material layer has a first region neighboring the negative electrode current collector and a second region disposed on the first region and located at a surface of the negative electrode active material layer,
wherein the first region contains natural graphite in a weight ratio of equal to or greater than 80% of the graphite material; and
the second region contains artificial graphite in a weight ratio of equal to or greater than 80% of the graphite material.

2. The lithium-ion secondary battery according to claim 1, wherein the second region is a 10%-30% thickness region of the negative electrode active material layer from a surface of the negative electrode active material layer.

3. The lithium-ion secondary battery according to claim 1, wherein the first region is a region of the negative electrode active material layer excluding the second region.

4. The lithium-ion secondary battery according to claim 1, wherein the artificial graphite has a BET specific surface area of from 1.8 m$^2$/g to 4.0 m$^2$/g.

5. The lithium-ion secondary battery according to claim 1, wherein the natural graphite has a BET specific surface area of from 2.0 m$^2$/g to 4.5 m$^2$/g.

6. The lithium-ion secondary battery according to claim 1, wherein the natural graphite is at least partially covered with an amorphous carbon film.

7. The lithium-ion secondary battery according to claim 6, wherein the weight ratio of the amorphous carbon film in the natural graphite is $0.01 \leq X \leq 0.10$.

8. A method of manufacturing a lithium-ion secondary battery, comprising:
- a step A of preparing a first paste comprising a mixture of natural graphite, a binder, and a solvent;
- a step B of preparing a second paste comprising a mixture of artificial graphite, a binder, and a solvent;
- a step C of coating the first paste prepared in the step A onto a negative electrode current collector; and
- a step D of coating the second paste prepared in the step B over the first paste coated on the negative electrode current collector in the step C.

* * * * *